United States Patent [19]

Kokeisl

[11] Patent Number: 5,040,840
[45] Date of Patent: Aug. 20, 1991

[54] GLARE PROTECTION DEVICE FOR MOTOR VEHICLE PASSENGERS

[76] Inventor: Theodor Kokeisl, Zurlindenstr. 21, CH-5000 Aarau, Switzerland

[21] Appl. No.: 547,978

[22] Filed: Jul. 2, 1990

[30] Foreign Application Priority Data

Jul. 10, 1989 [CH] Switzerland .................. 570/89

[51] Int. Cl.⁵ .............................................. B60J 3/00
[52] U.S. Cl. ................................ 296/97.6; 296/97.11
[58] Field of Search ............ 296/97.6, 97.9, 97.11, 296/97.8

[56] References Cited

U.S. PATENT DOCUMENTS

| | | | |
|---|---|---|---|
| 1,605,682 | 11/1926 | Mewborn | 296/97.9 X |
| 1,814,500 | 7/1931 | Summerbell | 296/97.11 X |
| 1,888,703 | 11/1932 | Summerbell | 296/97.11 X |
| 1,894,233 | 1/1933 | Ellis | 296/97.11 X |
| 2,210,762 | 8/1940 | Itzigson | 296/97.9 |
| 2,235,421 | 3/1941 | Devine | 296/97.11 |
| 2,559,471 | 7/1951 | Schrock | 296/97.11 |
| 2,829,920 | 4/1958 | Cohen | 296/97.11 |
| 2,874,994 | 2/1959 | Chester | 296/97.6 |
| 3,008,758 | 11/1961 | McCormick | 296/97.11 |
| 4,023,855 | 5/1977 | Janata et al. | 296/97.6 |
| 4,090,732 | 5/1978 | Vistitsky | |
| 4,512,605 | 4/1985 | Aschermann et al. | 296/97.11 |
| 4,679,842 | 7/1987 | Hwang-Change | 296/97.11 |
| 4,950,021 | 8/1990 | Vandagriff | 296/97.11 X |

FOREIGN PATENT DOCUMENTS

| | | |
|---|---|---|
| 2332613 | 1/1975 | Fed. Rep. of Germany . |
| 1108095 | 1/1956 | France .................. 296/97.11 |
| 1126136 | 11/1956 | France .................. 296/97.9 |
| 1449358 | 7/1966 | France .................. 296/97.6 |
| 2632255 | 12/1989 | France .................. 296/97.6 |
| 575011 | 3/1957 | Italy .................. 296/97.6 |
| 510386 | 5/1957 | Italy .................. 296/97.6 |
| 502907 | 3/1971 | Switzerland . |
| 322344 | 12/1929 | United Kingdom ........ 296/97.11 |

Primary Examiner—Margaret A. Focarino
Assistant Examiner—Joseph D. Pape
Attorney, Agent, or Firm—W. G. Fasse

[57] ABSTRACT

A glare protection device in a motor vehicle reduces the blinding of a motor vehicle driver or passenger caused by the headlights of an oncoming vehicle. A tinted translucent glare protection shield (3) is adjustably held by a guide rail (5) for adjusting the elevation of the shield which is also tiltable around an axis (8). The guide rail (5) is secured by an attachment system, to the sun visor (1) of the motor vehicle, preferably so that it is detachable. When not in use, the glare protection shield (3) is folded-up around the axis (8).

7 Claims, 3 Drawing Sheets

GLARE PROTECTION DEVICE FOR MOTOR VEHICLE PASSENGERS

FIELD OF THE INVENTION

The invention relates to a glare protection device for protecting passengers in a motor vehicle against the danger from the glare of the front lights of oncoming vehicles. Such a device includes a plate-like tinted glare protection shield and attachment means for securing the shield to the sun visor of the motor vehicle or to another motor vehicle component.

BACKGROUND INFORMATION

The glare of oncoming vehicles is uncomfortable to the driver and passenger during nighttime motor vehicle driving. This glare is especially a problem when the headlights are set on high beam and the vehicles are also equipped with high intensity halogen lamps.

This glare severely and adversely affects the eyes of a motor vehicle driver and passengers alike, thereby reducing the view in the driver's own lane and in the opposite lane. After a blinding, the human eye needs several seconds to readapt to the darkness or to the lighting conditions prevailing prior to the blinding. During this transition or adaptation time, the danger of an accident is increased.

From Swiss Patent Publication (CH-PS) 502,907, a supplementary shield for motor vehicles is known, that can be attached by two clamps to the sun visor of the motor vehicle. It is dissatisfactory that this supplementary shield can be shifted only parallel to the plane or surface of the sun visor and that the shield must be removed from the sun visor when the shield is not in use.

OBJECTS OF THE INVENTION

In view of the foregoing it is the aim of the invention to achieve the following objects singly or in combination:

- to provide a glare protection device that allows an individual adjustment of its level and incline in a simple way and with due regard to the seat position and eye-level of the respective motor vehicle passenger or driver;
- to construct such a device so that it can be folded up to a non-disturbing position when not in use;
- to make the adjustment of the glare protection device independent of any instantaneous position of the sun visor; and to make it possible for the driver and passenger to selectively look through the glare protection device or through the windshield.

SUMMARY OF THE INVENTION

This aim is achieved according to the invention in that the glare protection shield is mounted to be linearly slidable in or along an elongated guide rail and so that it is tiltable about an axis arranged perpendicularly to the sliding direction.

These features make it possible to adjust the position of the glare protection shield individually according to body height and the distance between eyes and the glare protection shield independently of the incline of the sun visor, for example, available in the motor vehicle to which the glare protection device can be attached. The adjustment allows an exact positioning of the glare protection device so that an unobstructed view of the driving lane is normally possible under and next to the glare protection shield, and so that it is possible by a slight movement of the head or eyes to see through the tinted glare protection shield for avoiding blinding during conditions of glare danger from oncoming vehicle lights. When not in use, it is not necessary to remove the present glare protection device, instead due to its flat construction, the device can be folded up behind the sun visor that is flipped upward.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
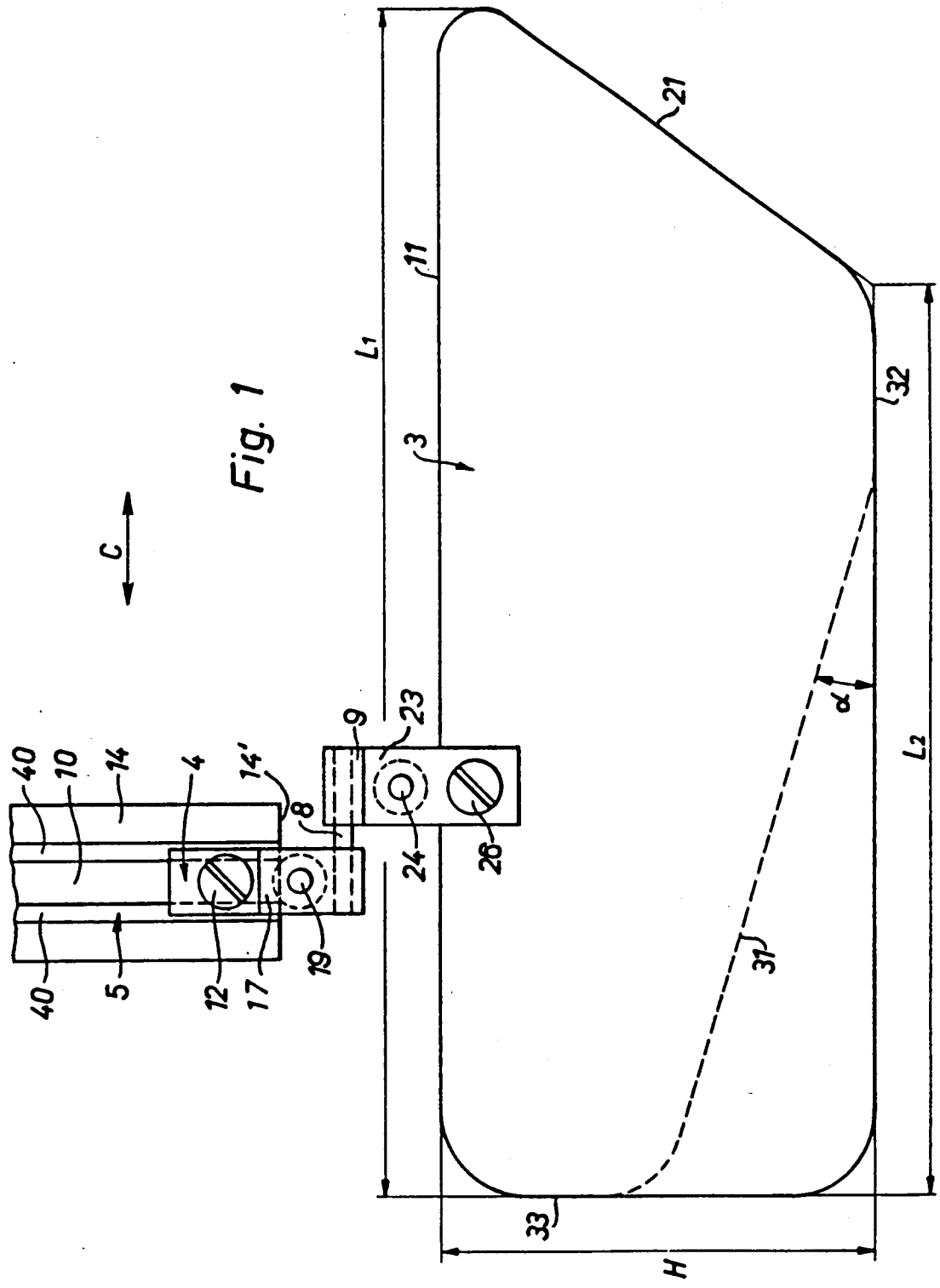
FIG. 1 is a plan view of the present glare protection device.
Figure 2:
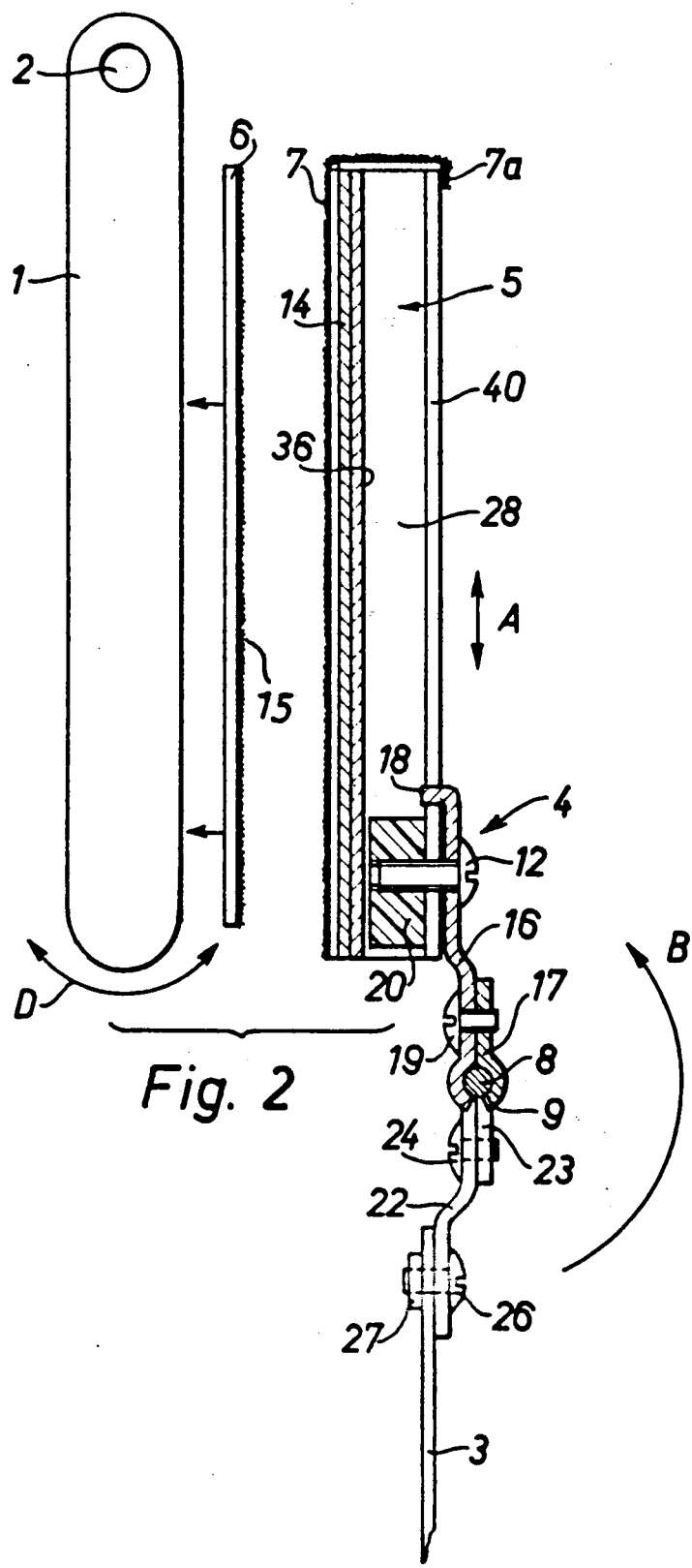
FIG. 2 is a side view, partially in section, of the present glare protection device, shown in combination with a motor vehicle sun visor.
Figure 3:
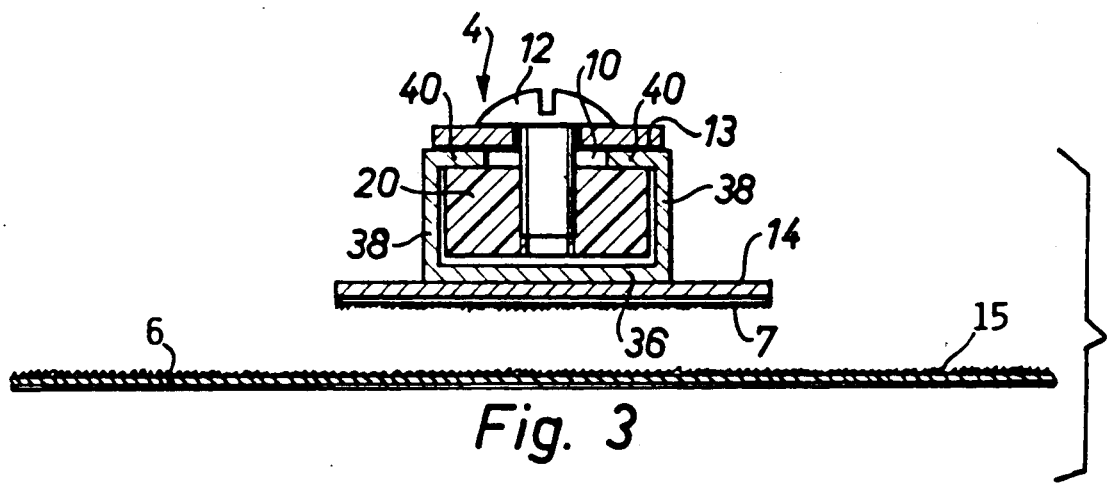
FIG. 3 is a cross-section through a slide bar.

The glare protection device of FIGS. 1 and 2 comprises a dark tinted, but translucent, plastic glare protection shield 3 that is linearly slideable along a guide rail 5 in the direction indicated by the double arrow A in FIG. 2 and that is swingable, relative to this guide rail 5, around the axis 8 according to the arrow B. As shown in FIG. 3, the guide rail 5 is of a box-type construction and comprises a bottom surface 36, two side walls 38 that are parallel to one another, and at right angles to the bottom surface 36. Two elongated flanges 40 extend in parallel to the bottom surface 36 and project toward one another from the side walls 38 and leave a slot 10 free in the middle. A wide support plate 14 is rigidly fixed to the guide rail 5 opposite the bottom surface 36. The guide rail 5 and the support plate 14 can also be constructed as one integral component, preferably of aluminum. A slide bar 4 is held on the guide rail 5 so as to be linearly movable. A block shaped sliding body 20, preferably of plastic material, is secured inside the interior of the guide rail 5. A first connector plate 16 is attached to the sliding body 20 on the upper side of the guide rail 5 by means of a screw 12. Between the first connector plate 16 and both flanges 40 there is a friction lining 13, for example, a felt or rubber disk 13. The screw 12 pulls the sliding body 20 against the inner sides of both flanges 40, whereby the sliding body 20 is guided laterally inside the guide rail 5. By adjusting the tightness of the screw 12 it is possible to vary the friction action between the friction lining 13 on the first connector plate 16 and the guide rail 5. The friction action is adjusted so that the slide bar 4 can be easily moved by hand in the direction of the double arrow A, but without being displaceable by vibrations.

The first connector plate 16 and a first clamp shoe or member 17 enclose a journal pin 8. The connector plate 16 and clamp shoe 17 are connected by a clamping screw 19. A second connector plate 22 and a second clamp shoe or member 23 are laterally connected to the journal pin 8, said plates 22 and shoe 23 being fastened to each other by a second clamping screw 24. The clamping effect or action of either clamping screw 19 or 24 is adjusted, so that a rotational movement around or with the journal pin 8 is possible after overcoming a frictional resistance, in such a way that the glare protection shield 3 can be swung around the cylindrical journal pin 8 in the direction of arrow B. The first and second connector plates 16, 22 both have the same construction. The first and second clamp shoes 17, 23 also are both of the same form or shape. The glare protection shield 3 is attached to the second connector plate 22 by a bolt 26 with a nut 27.

The slide bar 4 is constructed so that when it is in its lowest end position, the journal pin 8 is furthest from the end 14' of the guide rail 5, as depicted in FIG. 1. In this way, the glare protection shield 3 can also be tilted in the opposite direction of arrow B to both sides of the sliding plane, as depicted in FIG. 2.

To insure against unwanted lateral tilting the first connector plate 16 is provided at its upper end with a catch 18 that fits into the longitudinal slot 10.

Figure 4:
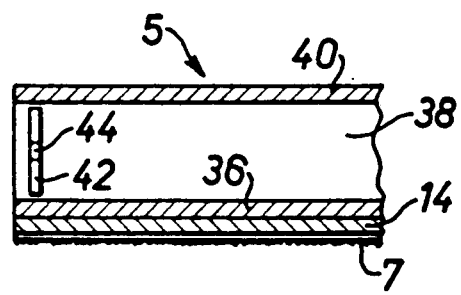
FIG. 4 is a partial longitudinal section through the guide rail.

The upper edge 11 of the glare protection shield 3 runs parallel to the journal pin 8. The length $L_1$ is, at most, 20 cm, preferably 16-18 cm. The glare protection shield 3 has the shape of a right-angled trapezoid. The diagonal edge 21 runs at a 45° angle to the upper edge 11. The lower edge 32 has a length $L_2$ of 16 cm, at the most, preferably 12-14 cm. The height H should not be more than 10 cm and preferably 7-8 cm. As a variation to the example given, the lower edge 31 could also run at an angle $\alpha$ of $16 \geq -°22°$. A further variation is that the glare protection shield 3 could comprise steps. To limit the movement of the slide bar 4, the guide rail 5 is equipped with stops 42 at both ends. According to FIG. 4, these stops 42 comprise thin elastic disks with cams that catch in slots 44 of the side walls 38. Due to their spring action, these stop disks 42 can be installed after the slide bar 4 is inserted in the guide rail 5.

The side of the support plate 14 facing away from the guide rail 5 has a bonding coating. Such a bonding coating is an adhesive layer or a burr-locking component which is a (VELCRO ®) type of connection, so that the support plate 14 and the firmly attached guide rail 5 can be secured to a sun visor of a motor vehicle. Preferably, a known burr-locking system is used, in which one component has very small hooks or mushroom shaped heads that catch onto fleece type loops of the complementary component 15 in response to pressure and are detachable from one another. One burr-locking component 7 is glued to the support plate 14 or the bottom 36 if the plate 14 is omitted and led at the top and the end of the guide rail so that a support strip 7a is formed for the folded-up glare protection shield. An adhesive coated strip 6 carrying the complementary component 15 of the burr-locking system, is glued to the sun visor 1. The strip 6 is substantially longer than the width of the support plate 14, preferably at least twice as long as the width of the support plate 14, so that there is a great variety of attachment possibilities in the direction of the double arrow C (FIG. 1) between the burr-locking component 7 and the sun visor 1. The attachment of the glare protection device to the sun visor 1 is achieved by slightly pressing the first burr-locking component 7 against the complementary burr-locking component 15. If the chosen attachment position is unsatisfactory to any particular motor vehicle passenger or driver, the two components of the burr-locking system can easily be detached from one another and reconnected in another position.

The sun visor 1 and the glare protection device can be tilted together around a bolt 2 in the direction of the double arrow D shown in FIG. 2. In this way, a motor vehicle passenger or driver can tilt the sun visor 1 around the bolt 2 and the glare protection device around the parallel journal pin 8 into an acceptable position. The elevation of the glare protection shield 3 can be adjusted with the slide bar 4. When not in use, the glare protection shield 3 can be tilted up around the journal pin 8. Due to the flat construction of the glare protection device, the sun visor 1 can also be flipped up when the glare protection shield 3 is folded-up and not in use.

The glare protection device could also form an integral part of the sun visor 1.

The glare protection device can be attached to motor vehicle components other than the sun visor 1 and can also be used against the glare of the sun. The detachable connection permits an attachment to the front or side struts of the vehicle body above the front or side windows.

Another variation of the slide bar is seen in that the slide bar is placed astride the guide rail. Incidentally, it is to be understood that a pipe shaped component is intended to be included in the term "guide rail".

Although the invention has been described with reference to specific example embodiments, it will be appreciated that it is intended to cover all modifications and equivalents within the scope of the appended claims.

What I claim is:

1. A glare protection device for protecting persons in a motor vehicle against the danger of blinding by headlights of oncoming vehicles, comprising a tinted glare protection shield (3), means for attaching said protection shield to a sun visor (1) of a motor vehicle, said protection shield (3) comprising an upper edge (11) and a lower edge (32), said attaching means comprising an elongated guide rail (5) to be fixed on said sun visor (1), a slide bar (4) movably slidable in a sliding direction along said guide rail (5), said guide rail (5) comprising a stop (42) at least at a lower end of said guide rail (5) for limiting movement of said slide bar (4), first and second connector plates (16, 22) arranged between said slide bar (4) and said protection shield (3), a journal pin (8) connecting both said first and second connector plates (16, 22) to each other, said journal pin and said upper edge (11) of the protection shield (3) being both located below said lower end (14') of said guide rail (5) when said slide bar (4) is in its lowest position for tilting said protection shield (3) through more than 180° and to both sides of a sliding plane defined by said slide bar (4), and clamping means for clamping said journal pin (8) to said first and second connector plates with a friction fit for increasing friction between said journal pin (8) and said connector plates.

2. The device of claim 1, wherein said means for attaching said protection shield (3) to a sun visor (1) comprise a first pressure sensitive readily releasable engaging strip on a back side of said guide rail, a second pressure sensitive readily releasable engaging strip having an adhesive coating on a back side thereof for securing to a back side of said sun visor and a front side for cooperating with said first strip to be detachable from one another.

3. The device of claim 1, wherein said guide rail (5) comprises a box-type rail with a longitudinal slot (10) therein, said slide bar catching behind said longitudinal slot (10), said first connector plate (16) having a catch (18) extending into said longitudinal slot (10) for preventing unwanted lateral tilting of said first connector plate (16) relative to said box-type rail (5).

4. The device of claim 1, wherein said means for attaching said protection shield to a sun visor (1) comprise a support plate for said guide rail (5), said support plate (14) being wider than said guide rail (5), said support plate comprising a first strip (7) with a first type of pressure sensitive attachment means, a second strip (6) having on one side thereof a second type of pressure sensitive readily releasable attachment means (15) cooperating with said first strip (7), whereby said first and second strips are detachable from one another, said second strip (6) having a length which is greater than a width of said first strip (7), said second strip (6) comprising an adhesive coating on its opposite side for attachment to a sun visor, and wherein said length of said second strip (6) extends substantially perpendicularly to said sliding direction.

5. The device of claim 1, wherein said guide rail (5) is a box-type rail having a longitudinal slot (10) in the middle part thereof, said first connector plate (16) being arranged outside of said guide rail (5) and attached to a sliding body (20) in-side said guide rail (5), friction means (13) arranged between said slide bar (4) and said guide rail (5), and wherein said clamping means comprise a first clamp shoe (17) holding a first longitudinal section of said journal pin (8) against said first connector plate (16), a second clamp shoe (23) holding a second longitudinal section of said journal pin (8) against said second connector plate (22), and means for pressing said clamp shoes against the respective section of said journal pin for adjusting the friction between said journal pin and said clamp shoes.

6. The utilization of a glare protection device of claim 1, characterized in that said tinted glare protection shield (3) is dimensioned and attached to a sun visor (1) of a motor vehicle so that it is tiltable and vertically movable, in such a way that a motor vehicle passenger or driver can selectively view through said tinted shield or through a windshield by merely slightly moving the head or eyes to see through said tinted shield (3) for avoiding the glare of oncoming vehicle headlights, or to lock next to or under said tinted shield (3), said glare protection shield (3) having a length ($L_1$) within the range of 16 to 20 cm and a height (H) within the range of 7 to 10 cm.

7. The combination of a glare protection shield with a sun visor for protecting a person in a motor vehicle against the danger of blinding by headlights of oncoming vehicles, comprising a sun visor (1), a tinted glare protection shield (3), means for attaching said protection shield to said sun visor (1), said protection shield (3) comprising an upper edge (11) and a lower edge (32), said attaching means comprising an elongated guide rail (5), means securing said guide rail to said sun visor (1), a slide bar (4) movably slideable in a sliding direction along said guide rail (5), said guide rail (5) comprising a stop (42) at least at a lower end (14') of said guide rail (5) for limiting movement of said slide bar (4), first and second connector plates (16, 22) for connecting said slide bar (4) to said protection shield (3), whereby said first connector plate is secured to said slide bar and said second connector plate is secured to said protection shield (3), a journal pin (8) connecting said first and second connector plates (16, 22) to each other, said journal pin and said upper edge (11) of the protection shield (3) being both located below said lower end (14') of said guide rail (5) when said slide bar means (4) is in its lowest position for tilting said protection shield (3) through more than 180° and to both sides of a sliding plane defined by said slide bar (4), and clamping means for clamping said journal pin (8) to said first and second connector plates with a friction fit for increasing friction between said journal pin (8) and said connector plates, said clamping means comprising a first clamping shoe for clamping one portion of said journal pin to said first connector plate and a second clamping shoe for clamping another portion of said journal pin to said second connector plate.

* * * * *